United States Patent Office 2,964,268
Patented Dec. 13, 1960

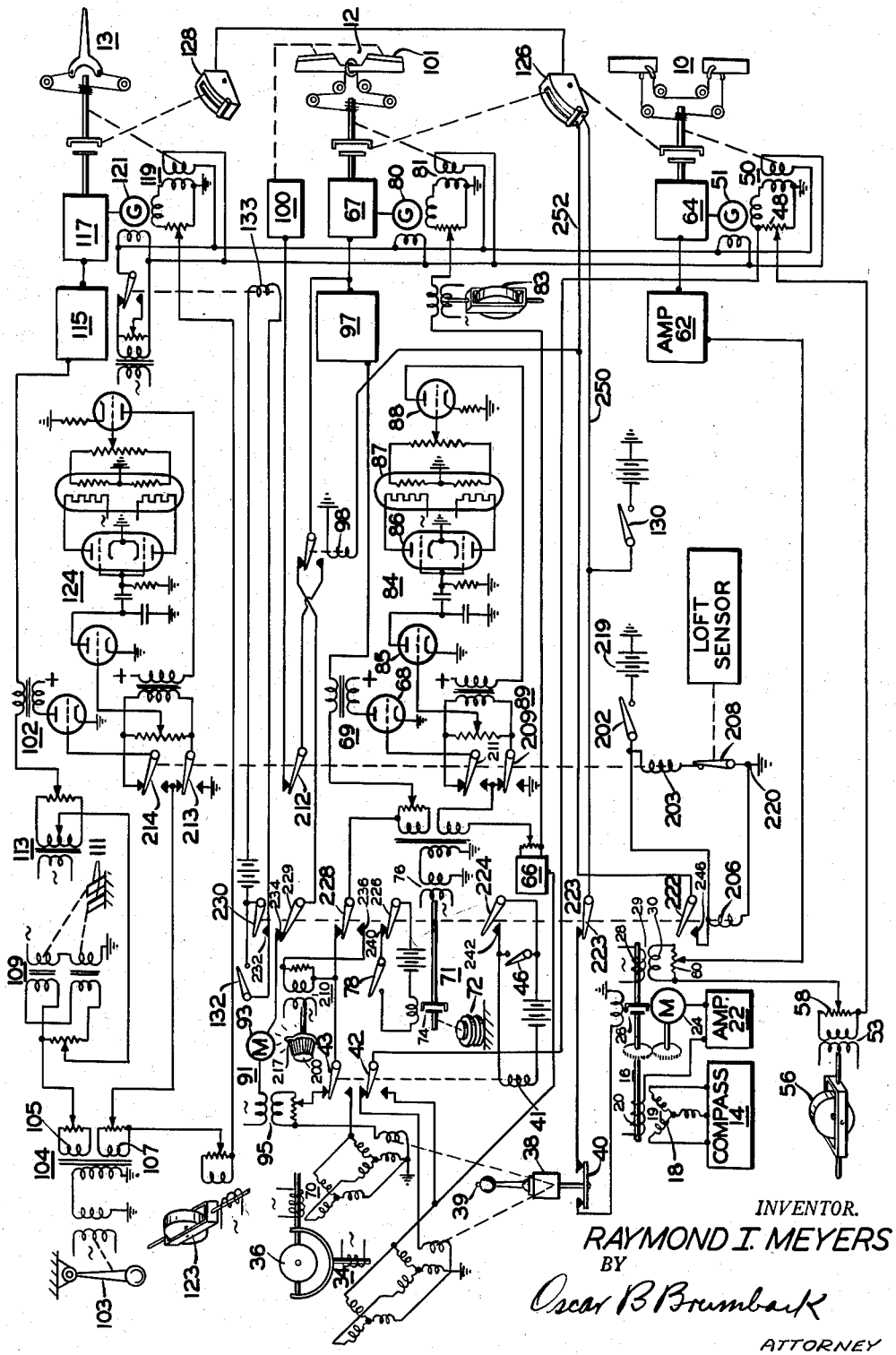

2,964,268

AIRCRAFT AUTOMATIC PITCH CONTROL SYSTEM

Raymond I. Meyers, Hasbrouck Heights, N.J., assignor to The Bendix Corporation, a corporation of Delaware Filed June 17, 1953, Ser. No. 362,192

11 Claims. (Cl. 244—77)

This invention relates generally to the automatic control of aircraft and, more particularly, to the automatic control of craft during catapult launching.

To launch an aircraft with a catapult, the catapult applies an external thrust force to the craft that is in addition to the thrust produced by the power plant of the craft. As a result, the craft attains a flying speed after a short distance of travel from a stationary starting position. The magnitude of the accelerations produced frequently is so great that the human pilot partially loses consciousness and is unable to control the craft adequately.

An object of the present invention, therefore, is to provide novel apparatus for automatically controlling an aircraft during launching.

Another object of the present invention is to provide novel apparatus for maintaining an aircraft at a preselected pitch angle automatically after the launching of the craft until the human pilot returns the automatic pilot system to normal flight control or releases the automatic pilot system and flies the craft manually.

The present invention contemplates novel apparatus for preselecting a desired pitch attitude to be maintained and for rendering the heading control, altitude control, and automatic trim provisions of the craft ineffective until after the craft has been catapulted into the air at which time the automatic trim provisions are placed into operation.

The foregoing and other objects and novel features of the present invention will appear more fully from the following detailed description when the same is read in connection with the accompanying drawing. It is to be expressly understood, however, that the drawing is for the purpose of illustration only and is not intended as a definition of the limits of the invention.

The single sheet of drawing schematically illustrates a complete wiring diagram for the novel catapult launching control system of the present invention in operative association with an automatic pilot system.

The automatic pilot system may be generally of the type described in U.S. Patent No. 2,625,348, issued January 13, 1953 to P. A. Noxon et al. The reference signal developing devices may be inductive type signal generators, having a rotor movable relative to a stator to develop the signal. The servoamplifiers and servomotors for the ailerons 10, elevators 12, and rudder 13 may be identical and of well known types.

In the embodiment of the automatic pilot system herein, the aircraft is controlled in direction by means of the ailerons 10 as described in U.S. Patent No. 2,636,698, issued April 28, 1953 to J. C. Owen. For this purpose, an earth inductor compass 14 may be used to develop a signal corresponding to the magnetic heading of the aircraft.

In order for the automatic pilot system to maintain the craft on a heading which the human pilot can change at will, a master direction indicator 16 is provided. This may be similar to that described in copending application Serial No. 516,490, filed December 31, 1943, now Patent No. 2,674,423 and assigned to the assignee of the present invention. In such a master direction indicator, the magnetic heading signal from compass 14 is reproduced in a stator 18 of an inductive signal developing device 19. When a rotor 20 is displaced from a null position relative to the field of this stator, a corresponding signal is developed which, when amplified at an amplifier 22, energizes a motor 24 to drive the rotor to a null. When a magnetic clutch 26 is energized, a rotor 28 of an inductive device 29 is displaced relative to a stator 30 to develop a heading signal for the automatic control system.

Bank reference signals are supplied by an inductive device 34 on a conventional vertical gyro 36. These signals correspond to displacements of the craft about the roll axis relative to a predetermined bank position.

The human pilot may manually maneuver the aircraft through the automatic pilot system by moving a manual controller 38 which modifies the bank reference signal. This banks and turns the craft. One such controller is described in U.S. Patent No. 2,553,280, granted to F. H. S. Rossire on May 15, 1951. So that the turning of the craft will not be opposed by the heading control, a pin 39 must be depressed before the controller can be moved from its normally centered position. This moves a bridge element 40 to an open circuit position and deenergizes the magnetic clutch 26.

A level flight relay 41 is provided for returning the craft to straight and level flight during an emergency. When the armatures 42 and 43 of this relay are in their normal or upper position as shown, manual controller 38 can be manipulated to modify the bank reference signal. When the armatures are in their lower position, the bank reference signal will by-pass the manual controller 38 and be inserted directly into the roll control channel. Moving a switch 46 to a closed circuit position energizes relay 41 pulling the armatures downwardly.

In the roll control channel, the bank attitude signal or the bank attitude signal as modified by manual controller 38 is added at a potentiometer 48 to the signals from a follow-up device 50 and a rate generator 51. This signal combination from the wiper of potentiometer 48 is added with the signal developed by inductive device 53 connected with a conventional roll rate gyro 56 at a potentiometer 58. The signal from the master direction indicator 16, if the heading reference is used, is added to the foregoing signals at a potentiometer 60. After amplification by a servoamplifier 62, this signal summation energizes the servomotor 64 which moves aileron 10.

An aircraft tends to lose altitude as it banks to make a turn. To compensate for this, an up-elevator amplifier 66 in response to the bank attitude of the craft develops a signal for the elevator channel. This signal operates a servomotor 67 to move the elevators 12 so as to increase the angle of attack of the aircraft, thereby increasing the lift to maintain the craft at a constant altitude.

The pitch control channel of the automatic pilot system may be generally similar to that described in copending application Serial No. 217,988, filed March 28, 1951, now Patent No. 2,851,645 and assigned to the assignee of the present invention. This control channel is comprised of two signal chains whose signals are combined at an isolation and mixing station comprised of isolation amplifier 68 and mixing transformer 69. The combined signals are then applied to elevator servomotor 67. For purposes of illustration, these signal chains will be referred to as a displacement signal chain and a rate signal chain.

Considering first the displacement signal chain, an inductive device 70 on vertical gyro 36 supplies a pitch reference signal corresponding to the deviation of the craft from a predetermined pitch attitude. This signal may also be modified by the manipulation of manual controller 38. The action of manual controller 38 on the pitch channel, however, is by-passed when the armatures of the level flight relay 41 are moved downwardly so that the signal from the vertical gyro is added directly to the elevator control channel.

Since a craft due to updrafts, downdrafts, or change of throttle setting may change altitude without changing its pitch attitude, an altitude device 71 supplies a signal corresponding to the deviation of the craft from a predetermined altitude to maintain the craft on the prescribed altitude. This altitude control may be generally similar to that described in U.S. Patent No. 2,512,902, issued June 27, 1950, to F. H. S. Rossire wherein a barometric device 72 through a magnetic clutch 74 actuates an inductive signal developing device 76. Magnetic clutch 74 is energized to connect the altitude device into the system when switch 73 is moved to a closed circuit position.

Considering now the rate signal chain, signals from a rate generator 80, a follow-up device 81, a pitch rate gyro 83, and the "up-elevator amplifier" 66, and altitude control 71, are applied to a rate filter 84. This filter may be generally of the type described in copending application Serial No. 90,236, filed April 28, 1949, now Patent No. 2,754,418 and assigned to the assignee of the present invention. Such a filter develops a rate signal from the signal from the attitude device 71, cancels out the undesirable turn component of the signal which the pitch rate gyro 83 develops in addition to the desired component, and cancels out sustained signals from follow-up device 81 to automatically trim the craft. This filter is comprised of a preamplifier 85, a phase discriminator 86, a thermal time delay device 87, a post amplifier 88 and a feedback transformer 89 for feeding the output of the filter system back in opposition to the input.

In the pitch control channel, the pitch attitude signal from inductive device 70 on vertical gyro 36 or the pitch attitude signal as modified by manual controller 38, the altitude displacement signal, and the altitude rate signal, up-elevator signal, pitch rate gyro signal, rate generator signal, and follow-up signal as modified by the rate filter are combined algebraically and after being amplified by the servoamplifier 97, energize the elevator servomotor 67 to move the elevators 12.

Before the engagement of the automatic pilot system with the control surfaces, a pitch synchronizer 91 synchronizes the pitch control channel with the existing attitude of the aircraft. This pitch synchronizer is comprised generally of a motor 93 and an inductive signal generating device 95. When a signal exists at the input of servoamplifier 97, the servoamplifier develops an output which operates motor 93 to displace the rotor of inductive device 95 to develop a signal in opposition to the signal input. The net input signal to the servoamplifier is then zero, and its output is zero. When the automatic pilot is engaged with the control surfaces, an engage relay 98 opens the circuit from the servoamplifier to the pitch sychronizer. In the position of relay 98 shown, the automatic pilot system is not engaged.

To relieve the elevator servomotor of the necessity of exerting a sustained torque to maintain the aircraft in trim, a trim tab servomotor 100 is provided. The control for the trim tab servomotor 100 may be of the type described in copending application 795,065, filed December 31, 1947 and assigned to the assignee of the present invention, servomotors 100 and 67 operating from the output of amplifier 97. By way of a high gear ratio, servomotor 100 slowly displaces the trim tabs 101 in response to a sustained signal to trim the craft.

Turns of the aircraft are ordered through the roll channel by either the master direction indicator 16 or the manual controller 38. The yaw control channel responds to this turning to move the rudder to coordinate the turn. The yaw control channel herein may be generally similar to that described in copending application Serial No. 319,081, filed November 6, 1952, now abandoned and assigned to the assignee of the present invention. As in the pitch channel, the yaw control channel is comprised of a displacement and a rate signal chain, and these signal chains are combined at an isolation and mixing station 102.

Dynamic vertical sensor 103 may be a pendulum similar to that described in copending application 100,915, filed June 23, 1949, now Patent No. 2,759,689 and assigned to the assignee of the present invention. This sensor supplies a reference signal corresponding to displacement of the normal vertical of the craft from the dynamic vertical. A transformer 104 couples the signal across two potentiometers; a displacement potentiometer 105 and a rate potentiometer 107.

The voltage from the displacement potentiometer 105 is conducted through force links 109 which permit the human pilot to operate the rudder through the automatic pilot system by moving the rudder pedals 111 and through a yaw trim controller 113 to a rudder servoamplifier 115. The amplified signal energizes a servomotor 117 to move the rudder 13 to coordinate the turn of the aircraft. The rudder movement develops a signal in a follow-up device 119 and a rate generator 121; these signals are combined with the signal from a conventional yaw rate gyro 123, and the combination added to the dynamic vertical signal at rate potentiometer 107. This signal summation is applied to a rate filter which may be similar to the rate filter 84 discussed above in the pitch control channel. The output of the rate filter is combined with the signals in the displacement signal chain at isolation and mixing station 102 and the signal summation fed to servoamplifier 115.

Clutches connect and disconnect the automatic pilot system with the control surfaces: an engage station 126 operates the clutches to engage the roll and pitch channels of the automatic pilot system with aileron and elevator surfaces 10 and 12, and another engage station 128 engages the yaw control channel with rudder surface 13. The separate engage stations permit the yaw control channel to be engaged separately so that the human pilot can control the yaw channel through the force links 109 by manipulating the rudder pedals 111 to control the rudder surface 13 yet have the automatic pilot system damp the snaking (yaw) oscillations of the aircraft.

Engage stations 126 and 128 may be of the type described in copending application Serial No. 138,423, filed January 13, 1950, now Patent No. 2,663,519 and assigned to the assignee of the present invention; the engage stations 126 and 128 being held in an engaged position by a solenoid therein (not shown), once they have been engaged.

The automatic pilot is put into operation by the closing of an operating switch 130 to supply energization to the various electronic tubes and components of the automatic pilot system and to the solenoids of engage stations 126 and 128.

The signals developed by the follow-up devices which are connected with the servomotors correspond in amplitude and phase to the extent and direction of surface displacement from a streamlined position. The reference signals correspond in phase and amplitude to the direction and extent of deviation of the craft from a reference position. Since these follow-up signals are in phase opposition to the reference signals causing the surface displacement, a servomotor in response to a reference signal moves the surface until the resulting follow-up signal is equal in amplitude to the amplitude of the reference signal. The net input signal to the servomotor at this time is zero and the motor stops. Thus, the extent of surface displacement is made to correspond to the amount of deviation of the craft from a reference position.

When an aircraft is traveling at low speeds, a greater surface deflection is necessary for a given displacement of a craft from reference to return the craft quickly to reference than when it is traveling at high speeds. To provide for this change in surface deflections for a given signal under different operating conditions, a switch 132 energizes a relay to change the excitation to the rate generators and follow-ups. Thus a given surface deflection develops a follow-up signal of greater amplitude when the excitation value is high than when the excitation value is low. Accordingly, a given reference signal will produce a greater surface deflection at the low excitation value position of the switch than at its high position.

The automatic pilot system so far described is known and is well adapted for conventional flight operations.

In accordance with the present invention, novel apparatus is provided for the automatic pilot system so that it may be used for catapult launching operations; this novel apparatus automatically controls the craft both during and after the launching period. Once the novel apparatus is placed into operation, it keeps the craft in a preselected pitch attitude until the human pilot engages the automatic pilot system alone or disengages the system to control the craft manually.

The novel catapult control apparatus is comprised generally of a pitch attitude selector 200, a launch control switch 202, an automatic trim control solenoid operated relay 203, a holding solenoid operated relay system 206, and an automatic trim control system actuation switch 208.

The catapult attitude selector 200 is comprised of an inductive signal developing device 210 having a stator connected in displacement signal chain of the pitch channel and an energized rotor winding mounted on a manually operable shaft for rotation with respect to the stator. An indicator 217 on the shaft cooperating with indicia shows the preset attitude.

Launch control switch 202, when moved to a closed circuit position, energizes the solenoids of both the automatic trim control relay system 203 and holding relay system 206 from a suitable energy source such as battery 219; the circuit through relay 203 being completed to ground 220 through automatic trim control actuation switch 208.

The automatic trim control relay system 203 actuates armatures 209, 211, 212, 213 and 214. Upon the energization of relay 203, armatures 213 and 214 move downwardly grounding the input to the yaw rate filter circuit 124 and permitting the signals from rate generator 121, follow-up device 119 and rate gyro 123 to be sent directly to the isolation stage 102. Similarly, armatures 209 and 211 by moving downwardly ground the input to the pitch rate filter circuit 84 and permit the signals from rate generator 80, follow-up device 81 and pitch rate gyro 83 to be fed directly to the isolation stage 68, 69 in the pitch channel. Armature 212 moving downwardly deenergizes the trim tab motor 100.

Holding relay system 206 when energized, moves armatures 222, 223, 224, 226, 228, 229 and 230 downwardly from the position shown; the circuit for the holding relay being completed to ground 220 from battery 219. Armature 230 engaging contact 232 energizes relay 133 and places the excitation for follow-up devices and rate generator at the low value position. The disengagement of armatures 229 and contact 234 deenergizes motor 93 of the pitch synchronizer 91. The engagement of armature 228 with contact 236 places the catapult attitude selector 200 into the signal chain. The disengagement of armature 226 from contact 240 deenergizes magnetic clutch 74 so that altitude control 71 cannot be put into operation. The engagement of armature 224 and contact 242 energizes the level flight relay 41 thereby by-passing the manual controller 38. The disengagement of armature 223 from contact 244 deenergizes magnetic clutch 26 of the master direction indicator 16 rendering the heading control ineffective on the automatic pilot system. The engagement of armature 222 and contact 246 permits the holding relay system to be energized when engage stations 126 and 128 are moved to the engaged position thereby completing the circuit (by a switch means not shown) from lead 250 to 252 even though relay system 203 may be deenergized.

A suitable device is used to sense the instant the aircraft leaves the ground or is aloft when it is launched from the catapult. This may be a pressure sensor for indicating the weight upon the landing gear. The release of the load on the landing gear moves the automatic trim control actuation switch 208 to an open circuit position. Relay 203 is deenergized at this time, and armatures 209, 211, 212, 213 and 214 move upwardly, placing the yaw and pitch rate filters and control of the trim tab servomotor 100 into operation so as to begin automatically trimming the craft.

In operation, the human pilot selects the pitch attitude which gives the optimum angle of attack for the maximum speed at which the craft reaches during the catapult launching and moves the selector 200 to this attitude as indicated by index 217. He then moves control switch 202 to a closed circuit position energizing relays 203 and 206.

Relay 203 moves armatures 209, 211, 212, 213 and 214 downwardly shunting the rate filter circuits, and deenergizing trim tab motor 100. Relay 206 moves armatures 222, 223, 224, 226, 228, 229 and 230 downwardly. This puts the automatic pilot follow-up devices on the low excitation ratio, renders the altitude control and heading control ineffective, and places the catapult attitude selector into the signal chain. Engage stations 126 and 128 are moved to an engaged position connecting the automatic pilot system and the surfaces. The signal generated by the displacement of attitude selector 200 from a manual position then operates elevator servomotor 67 until the follow-up device 81 displaced with the elevator surface develops a signal equal and opposite to that signal developed by the attitude selector.

As the craft speeds down the runway due to the thrust of its engine and the external thrust of the catapult launching mechanism, it attains flying speed and is launched into the air. When the weight is removed from the wheels, switch 208 is moved to an open circuit position and relay 203 is deenergized. Armatures 209, 211, 212, 213 and 214 are moved upwardly placing the pitch and yaw rate filter circuits and control for the automatic trim tab motor 100 into operation.

Holding relay 206 remains energized although relay 203 has been deenergized. As the applied elevator causes the craft to assume a pitch attitude called for by the attitude selector, the pitch attitude signal developed at inductive device 70 on vertical gyro 36 becomes equal and opposite to the signal developed by the attitude selector inductive device 210. As these two signals gradually balance, the signal from elevator follow-up device 81 gradually brings the elevator surface back to normal streamlined position. The automatic pilot system maintains the craft in launch configuration at this pitch attitude until the human pilot moves engage station 126 to disengaged position. This is so even though the pilot should inadvertently open launch switch 202.

When engage station 126 is moved to the disengaged position and launch switch 202 is opened, relay 206 is deenergized. Armatures 222, 223, 224, 226, 228, 229 and 230 move upwardly shunting the catapult attitude selector inductive device 210 from the system and placing the pitch attitude of the pitch control channel under the control of the pitch take-off 70 on vertical gyro 36. The pitch synchronizer 91 is placed into operation to synchronize the pitch control channel with the pitch attitude of the craft. Armature 222 of the holding relay is disengaged from contact 246, and the automatic pilot may be reengaged by moving the engage station 126 to engage position without placing the launch control into operation. The magnetic clutch 26 of the master direction indicator 16, however, is energized so that the craft is maintained on its heading at the time that the engaged station is reengaged. The open circuiting of magnetic clutch 70 of altitude control 71 is removed, and the altitude control may be placed into operation by closing switch 78.

The foregoing has presented a novel catapult launching arrangement for automatic pilot systems wherein the aircraft is controlled automatically during and after the launching period. The craft is automatically maintained at a preset pitch attitude by the novel launching arrangement until the human pilot disengages the automatic pilot system. Thus, although the accelerations encountered in the launching process may cause the human pilot to temporarily lose consciousness, the novel launching arrangement automatically maintains the craft at an optimum pitch attitude until such time as the human pilot consciously removes the aircraft from the control of the automatic launching arrangement.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In combination with an automatic steering system of an aircraft, said steering system including automatic trim provisions, means operatively connected with said automatic steering system for actuating the latter to maintain the aircraft in an attitude preset before launching, and means operatively connected with said automatic trim provisions for rendering the latter ineffective before said aircraft is aloft and effective when said aircraft is airborne.

2. An automatic pilot system for aircraft having a main control surface and a trim tab surface on the control surface, comprising means for maintaining said aircraft in a desired attitude by operating said main surface, automatic trim provisions for operating said trim tab surface, and means operatively connected with said automatic trim provisions for automatically placing the latter into operation when the aircraft assumes an airborne condition.

3. An automatic steering system for the control surface of an aircraft, adapted to be launched by a catapult, comprising power means, means for connecting and disconnecting said power means and said surface, reference means for developing a signal corresponding to deviation of the aircraft from a predetermined attitude, preset control means adapted to be rendered effective developing a signal during launching corresponding to a desired preset attitude, follow-up means connected with said surface for developing a signal corresponding to displacement of said surface from a normal position, means connecting said signal developing means with said power means for actuating the latter by said signals and including means for selectively rendering said control means effective and ineffective.

4. An automatic steering system for the elevator surface of an aircraft adapted to be launched by a catapult, comprising a servomotor, means for connecting and disconnecting said servomotor and said elevator surface, reference means for developing a signal corresponding to deviation of the aircraft from a predetermined pitch attitude, control means settable before launching of the craft for developing a signal during launching corresponding to a desired pitch attitude, follow-up means connected with said surface for developing a signal corresponding to displacement of said surface from a normal position, and means for connecting all of the various aforesaid signal developing means to said servomotor to form a signal chain for actuating the latter by said signals, said last-named means including means for selectively disconnecting said control means from said signal chain.

5. An automatic steering system for the elevator surface of an aircraft adapted to be launched by a catapult, comprising a servomotor, means for connecting and disconnecting said servomotor and said elevator surface, reference means for developing a signal corresponding to deviation of the aircraft from a predetermined pitch attitude, preset control means settable before launching for developing a signal during launching corresponding to a desired pitch attitude, follow-up means connected with said surface for developing a signal corresponding to displacement of said surface from a normal position, and means for connecting all of the various aforesaid signal developing means to said servomotor in a signal chain for actuating the latter by said signals, said last-named means including means operable with said connecting and disconnecting means for removing said control means from said signal chain when said servomotor is disconnected from said surface.

6. A control system for an aircraft subject to launching accelerations which may be so great as to cause a human pilot to partially lose consciousness, comprising an automatic steering system, means for selectively disengaging said automatic steering system from said craft and for engaging said automatic steering system with said craft, whereby said automatic steering system is adapted upon engagement to maintain said craft in a normal pitch attitude, means connected with said automatic steering system for preconditioning the automatic steering system to maintain a launching attitude different from said normal attitude until said automatic steering system is disengaged from said craft whereby, should the human pilot lose consciousness, the desired pitch attitude is maintained until the human pilot regains consciousness and disengages the automatic steering system.

7. A control system for an aircraft adapted to be launched by a catapult, comprising an automatic steering system for stabilizing said craft in a predetermined attitude, means for engaging said automatic steering system for operation of said craft prior to launching, means for conditioning said automatic steering system prior to launching to maintain the craft in an attitude other than said predetermined attitude during launching, and means connected with said conditioning means and said engaged means and operable upon disengagement of said automatic steering system from said craft for rendering said conditioning means ineffective on the automatic steering system.

8. A control system for an aircraft adapted to be launched by a catapult, comprising means for automatically stabilizing the craft in a normal pitch attitude, control means settable before craft launching for altering the pitch attitude of the craft during launching from said normal attitude to a preselected attitude, and manually operable means for selectively rendering the latter effective and ineffective upon the stabilizing means.

9. A controller for an automatic pilot system of an aircraft adapted to be launched by a catapult and effective for normally maintaining the craft in level flight, comprising means for altering prior to craft launching the flight attitude of the craft from that normally maintained by the automatic pilot system to a desired attitude to be maintained immediately after launching, and means for selectively rendering said last-named means effective and ineffective upon the stabilizing means.

10. A control system for an aircraft adapted to be launched by a catapult, comprising an automatic steering system adapted to maintain said aircraft in a normal predetermined attitude, preset control means for altering the attitude of the craft during launching, first means selectively operative for connecting said automatic steering system with said craft and for disconnecting said automatic steering system from said craft, second means selectively operative for connecting said control means with said automatic steering system and for disconnecting said control means from said automatic steering system, and interlocking means operatively connected with said first means and said second means and operating said second means to disconnect said control means from said automatic steering system when said first means is operated to disconnect said automatic steering system from said craft whereby said first means may reconnect said automatic steering system with said aircraft without said control means being connected with the automatic steering system.

11. A control system for an aircraft adapted to be launched by a catapult, comprising means for maintaining the craft in a normal predetermined attitude, control means for preselecting before launching craft attitude to be maintained by said first means during launching, switch means having first and second positions for rendering said control means effective and ineffective, respectively, upon said first means, engage means selectively operable for connecting said first means with said aircraft and for disconnecting said first means from said aircraft, means connected with said engage means and said control means for rendering said control means ineffective on said first means with said switch means in the first position when the engage means is operated to disconnect said first means from the aircraft.

References Cited in the file of this patent

UNITED STATES PATENTS

| | | |
|---|---|---|
| 2,425,558 | Ohlendorf | Aug. 12, 1947 |
| 2,620,148 | Baring-Gould et al. | Dec. 2, 1952 |
| 2,649,262 | Fahrney | Aug. 18, 1953 |
| 2,674,711 | MacCallum | Apr. 6, 1954 |
| 2,740,082 | Sedgfield | Nov. 27, 1956 |
| 2,769,601 | Hagopian et al. | Nov. 6, 1956 |